(12) United States Patent
Tuttle

(10) Patent No.: US 6,324,262 B1
(45) Date of Patent: Nov. 27, 2001

(54) METHOD AND SYSTEM FOR AUTOMATED DELIVERY OF NONTRUNCATED MESSAGES

(75) Inventor: Robert Joseph Tuttle, Ormond Beach, FL (US)

(73) Assignee: Market Ability, Inc., Ormond Beach, FL (US)

( * ) Notice: Subject to any disclaimer, the term of this patent is extended or adjusted under 35 U.S.C. 154(b) by 0 days.

(21) Appl. No.: 09/124,697

(22) Filed: Jul. 29, 1998

Related U.S. Application Data

(60) Provisional application No. 60/079,454, filed on Mar. 26, 1998.

(51) Int. Cl.[7] .................................................. H04M 1/64
(52) U.S. Cl. ........................ 379/69; 379/88.22; 379/67.1
(58) Field of Search .............................. 379/67.1, 80, 81, 379/88.26, 88.27, 68, 70, 73, 74, 88.04, 88.18–88.25, 69, 87

(56) References Cited

U.S. PATENT DOCUMENTS

| | | | |
|---|---|---|---|
| 4,356,348 | | 10/1982 | Smith ........................................ 379/34 |
| 4,539,436 | | 9/1985 | Theis ........................................ 379/72 |
| 4,667,065 | | 5/1987 | Bangerter ............................... 379/351 |
| 4,692,817 | | 9/1987 | Theis ........................................ 360/12 |
| 4,941,168 | | 7/1990 | Kelly ........................................ 379/69 |
| 5,371,787 | | 12/1994 | Hamilton ............................... 379/386 |
| 5,430,792 | | 7/1995 | Jesurum ................................ 379/88.01 |
| 5,581,602 | | 12/1996 | Szlam .................................... 379/88.05 |
| 5,644,625 | * | 7/1997 | Solot .................................... 379/88.22 |
| 5,724,420 | * | 3/1998 | Torgrim ................................ 379/372 |
| 5,768,358 | * | 6/1998 | Venier et al. ........................... 379/207 |
| 5,799,066 | * | 8/1998 | Joyce et al. ........................... 379/88.04 |
| 5,901,214 | * | 5/1999 | Shaffer et al. ......................... 379/220 |
| 5,943,410 | * | 8/1999 | Shaffer et al. ......................... 379/213 |
| 5,995,826 | * | 11/1999 | Cox et al. ............................. 455/414 |
| 6,226,360 | * | 5/2001 | Goldberg et al. ....................... 379/69 |
| 6,233,319 | * | 5/2001 | Cox et al. ............................. 379/88.22 |

* cited by examiner

Primary Examiner—Fan Tsang
Assistant Examiner—Ovidio Escalante
(74) Attorney, Agent, or Firm—Brian S. Steinberg; Law Offices of Brian S. Steinberg

(57) ABSTRACT

Interactive system for responding to conditions after an answering machine has been detected in an automatic telephone number dialer system so that realistic sounding recorded messages can be delivered in their entirety within three seconds of an answering machine starting to record so that the message is delivered without truncation onto the answering machines recorder. The system accurately predicts when the connected answering machine begins recording. The system has a two tier approach which takes place after the system has already determined it has connected to an answering machine. In the first tier, the system monitors for one of two conditions which indicates that recording is about to begin. The first tier threshold is met when either a solid non human tone lasts at least one second in duration, or when there is silence for at least two seconds in duration. The second tier threshold has the system continue to analyze the call until a silence condition has been met. Once there is confirmation of silence the answering machine starts recording for a selected time period which depends upon the first tier. The system can work with all types of answering machines such as a tape machine, a digital machine, a pager, a telephone provider voice/memory call machine, and a cellular machine.

15 Claims, 6 Drawing Sheets

Form1

Current Database: c:\procall\master.mcb

☐ Message Deliv. to AM
☐ Message Deliv. to Human
☐ Human Conn ¥ W/held
☐ Dialing
☐ 3 Second Line Reset
☐ Loop Detect
☐ No Connected
☐ Updating Record
☐ Timer Mode c:\procall\ladyluck\

Search  ⦿ No Pauses   ○ Pause After Pass  | 1 |

| | | | | | |
|---|---|---|---|---|---|
| Number of Calls Placed | 0 | 0 | Total AM connect | 0 | 0 |
| Number of Connections | 0 | 0 | Total of human connect | 0 | 0 |
| Percentage Completed | 0 | 0 | Human Msgs Withheld | 0 | Label44 |

☒ Leave message with humans
Dialing Prefix   *67.1

☒ Reset Record Counter
☒ Reset Data Fields

---

Automated Call Out Line 16

| Idle | Status IDLE | |
|---|---|---|
| Status Indicator | Calls attmptd: 0 | Start |

Form1

Lnk  DialT  Dial  Ring  GM  Msg   R
●     ●     ●    ●     ●   ●
Updating record           2.25

ProCall Recap

Pro-Call

| | | Database | Attempts | Connect | | | |
|---|---|---|---|---|---|---|---|
| Total Records in Database: | 19553 | | | | | | |
| Total Attempts | 22408 | | | | | | |
| Total Connects | 17121 | 87.56 | 76.41 | | | | |
| Answering Machines | 9547 | 48.83 | 42.61 | 55.76 | 38.95 | 91.47 | 0.81 |
| Human Answers | 7574 | 38.74 | 33.80 | 44.24 | 44.24 | 78.87 | 1.91 |
| Busy | 53 | 0.27 | 0.24 | 319804 | | | |
| Fax | 119 | 0.61 | .053 | | | | |
| No Answer | 393 | 2.01 | 1.75 | | | | |
| No Right | 0 | 0.04 | 0.04 | | | | |
| Operator Intercept | 1859 | 9.51 | 8.30 | | | | |
| Unreachable Records | 1986 | 1016 | 8.86 | | | | |
| Fax - No Ring- Operator Intercept | | | | | | | |
| Retry-able Records | 446 | | 2.28 | | | | |
| Reason Busy+ No Answer | | | | | | | |

Run | 99.98466    Show Pricing    Stats to File

Use Database | c:\procall\ladyluck\lady2_5.mdb    Close

Figure 4B

METHOD AND SYSTEM FOR AUTOMATED DELIVERY OF NONTRUNCATED MESSAGES

This application is a Continuation of the Provisional Patent Application No. 60/079,454 filed on Mar. 26, 1998 by the same assignee and the same inventors of the subject invention.

This invention relates to telephone answering systems, and in particular to interactively monitoring conditions after an answering machine as been detected in automatic telephone number dialer systems in order to deliver realistic sounding recorded messages in their entirety without truncation onto the answering machines recorder. The system further compiles and updates statistics in a database based on results of the dialed calls.

BACKGROUND AND PRIOR ART

Telemarketers generally attempt to deliver information messages by telephone to live consumers. In the last decade, automatic telephone answering machines have become a popular addition to most homes and businesses. Telemarketers are usually reluctant to leave information messages on these answering machines. Thus, it has become more popular than ever for the telemarketers to use computers which will detect conditions that an answering machine is receiving the call so that the call can be dropped(hung up). See for example: U.S. Pat. No. 4,356,348 to Smith. These dropped calls can be quite significant when considering the number of answering machines and undelivered information messages that occur.

Attempts have been made over the years to overcome the problems with delivering messages to telephone answering machines. See for example U.S. Pat. No. 4,667,065 to Bangerter; U.S. Pat. No. 4,941,168 to Kelly, Jr.; U.S. Pat. No. 5,371,787 to Hamilton; U.S. Pat. No. 5,430,792 to Jesurum et al.; and U.S. Pat. No. 5,581,602 to Szlam et al. However, these patents are generally are limited to sensing audio signals generated by the answering machines and and do not cover all the types of answering machines which start recording after different selected delay times. For example, many of these devices commence playing a recorded message based on mistakenly detecting when the "beep" has occurred. The false "beep" signal is a common problem for real callers trying to leave messages on answering machines. Furthermore, these patents do not fully analyze the connected calls in order to utilize preselected delay times to deliver and play recorded messages.

Message delivery systems which deliver a recorded message to an answering machine must solve the problem of determining when to "Launch"(begin playback of) the prerecorded message. Conventional systems rely on a timer to determine the moment to begin playback of the recorded message. Typically a timer is initiated once the determination has been made that the call has been answered by a machine. Message delivery systems which rely on timed delivery experience a high percentage of truncation of the recorded message. This is a result of the system begins to play of the recorded message BEFORE the answering machine starts recording.

Another serious problem with timer based systems is that many answering machines will "hang up" on the system before the message launches. This is due to a "vox" function in many answering machines which allows them to stop recording after they detect several seconds of silence. If a timer based system waits too long before launching the message, the called answering machine may have already hung up before the message playback begins.

SUMMARY OF THE INVENTION

The first objective of the present invention is to provide a computer based system capable of accurately interpreting an answering machine's playback condition so as to deliver prerecorded messages in their entirety(without truncation) onto the answering machine.

The second object of this invention is to provide a system for delivering prerecorded messages onto answering machines to insure the message sounds realistic(non recorded), in that the message is delivered shortly AFTER the answering machine begins recording.

The third object of this invention is to provide a telephone dialing software message delivery system that overcomes leaving messages on machines based on a false "beep" signal.

RealCall replaces the pre-set timer controls of the prior art devices with an "interactive" logic, where the invention "listens" to the answering machine's outgoing message and waits for a condition suggesting that the answering machine is in "record" mode. RealCall tests for the "record" mode condition by continuing to "listen" to the call for confirmation before starting to launch. As a result, the time interval from the moment the call connects until RealCall "launches" a message is different for each call placed by the RealCall system.

The novel invention is a next level that comes into play after the system has detected whether the received call in the dialer system has reached a live person or an answering machine. Such a system is described in reference to U.S. Pat. No. 5,371,787 to Hamilton, which is incorporated by reference.

A preferred embodiment of the invention uses dual two tier steps after determining an answering machine has been reached. One two tier approach determines if a solid non human tone of at least one second duration is detected in the connected call and then playing the recorded information message only after the tone has been follow by a preselected interval of silence. The other two tier approach determines if silence of at least two seconds is detected in the connected call in leu of the indication of a solid non human tone of at least one second duration and then playing the recorded information message only after another one second interval of silence has been detected. The system allows for the delivery of a complete pre-selected message in a nontruncated form onto the answering machine within approximately two to three seconds of the start of the answering machine's recording step without allowing the machine to cut-off the complete pre-selected message, during the recording so that a user of the answering machine playing the complete pre-selected message believes a human and not a machine initiated the realistic recording. Unlike the limitations in the prior art systems, the novel invention can be used with all types of answering machines such as but not limited to a tape machine, a digital machine, a pager, a telephone provider voice/memory call machine, and a cellular machine.

Further objects and advantages of this invention will be apparent from the following detailed description of a presently preferred embodiment which is illustrated schematically in the accompanying drawings.

BRIEF DESCRIPTION OF THE FIGURES

FIG. 4 shows an exemplary output Recap form of the RealCall invention.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
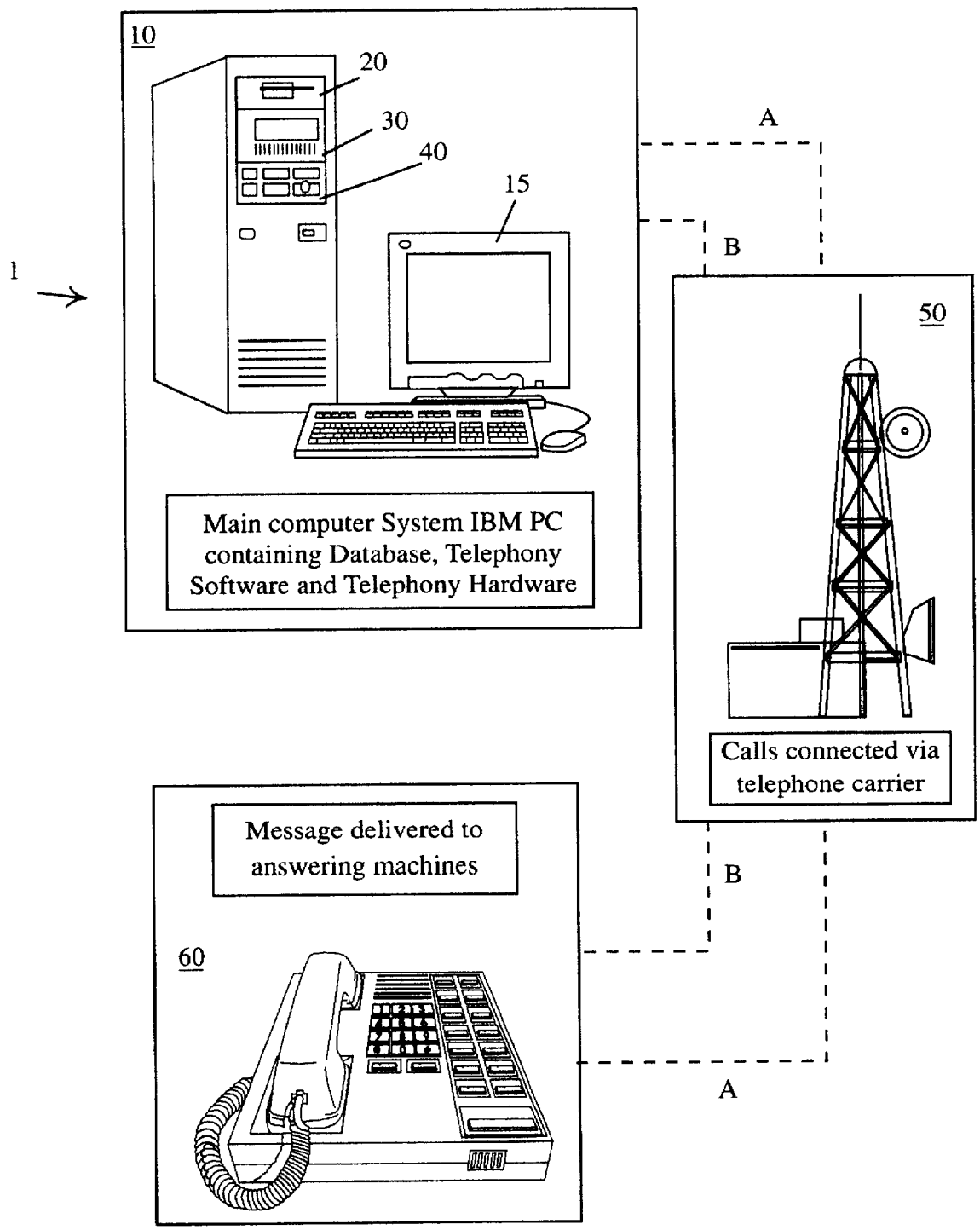
FIG. 1 illustrates a preferred setup of using the novel telephone dialing software message delivery system invention.

FIG. 1 illustrates a preferred setup 1 of using the novel telephone dialing software message delivery system invention. Referring to FIG. 1, the invention 1, includes a main computer system 1 connected to a telephone carrier 50 which in turn is connected to remotely located answering machines 80. Main computer system 10 includes a PC 15 such as an IBM compatible PC having 200 MHZ or higher, with Pentium pro, Pentium II processor and the like, including a standard harddrive, 14" or greater color monitor, mouse and keyboard for input. PC 15 is connected to a Telephony Hardware 20 such as but not limited to an Analog/Digital Multi Channel Telephony card such as the Dialogic D41D(Analog), D240SC-T1 and D/240SC-T2 (Digital), and the like. The CT hardware 20 can be a computer card used in the computer 10 and includes the following features of playing voice messages to a caller, digitizing and recording voice signals, connecting directly to telephone lines, and placing outbound calls and reporting the results of the calls. The Dialogic Computer Telephony(CT) card model no. D41D, D/240SC-T1 and D/240SC-2T1 can allow multiple telephone lines to operate. The software 30 uses multitasking OS(Windows 95 and Windows NT and OS2), and can be developed with programming language software such as but not limited to C++, Visual Basic, Delphi, and the like. Software 30 further uses a Custom Control software for control of the CT hardware 20. Programming languages(i.e. Microsoft's Visual Basic) provide a conduit for programmers to access a computers built in capabilities. Programming languages refer to code which accesses specific capabilities, such as viewing the contents of a hard drive, playing sound files over a computer's sound card as CONTROLs. The Custom Control software 30 are controls which are not provided as part of the programming language, but are typically developed by third party software developers.

The software 30 further uses database software for maintaining the calling lists, such as but not limited to Microsoft Access, Dbase, Foxpro, and the like. The calling lists in the RealCall invention contain at least the following: phone number(approximately 10 digits), time zone, message file name(s), call history field, connect time field, record number (unique), date and time of call, and last call status. Although not required, the calling lists can contain additional information such as but not limited to names, addresses, past consumer behavior, and the like.

Along with the telephony CT hardware 20 and software 30 is the telephone service 40 such as but not limited to Analog(RJ11–RJ14) interface, Digital(T1) interface and the like, which comes from the telephone service provider. The telephone service provider, such as but not limited to Southern Bell and AT&T, provides access to the network of telephone lines linking all telephones across the United States.

A telephone carrier 50 connects automatically dialed calls A from main computer system 10 to deliver messages to the remotely located answering machines 60, and the CT hardware 10 monitors the call status B. For example, Bell South can provide a "Dial Tone" service, (which can be required by some CT hardware) and MCI can provide digital T1 service (no dial tone). Both Bell South and MCI can provide a "Switching" capability, wherein each call can be routed over any available wire network to deliver the call to the appropriate telephone.

The RealCall invention can successfully interpret both traditional answering machines(tape and digital) as well as answering services such as but not limited to Bell South's "Personal Voice Mail" and "Memory Call" as well as cellular phone answering services such as "Mobile Memo" and pager messaging services. The RealCall invention can work with any answering system which plays a voice message and then records the callers message.

Figure 2:
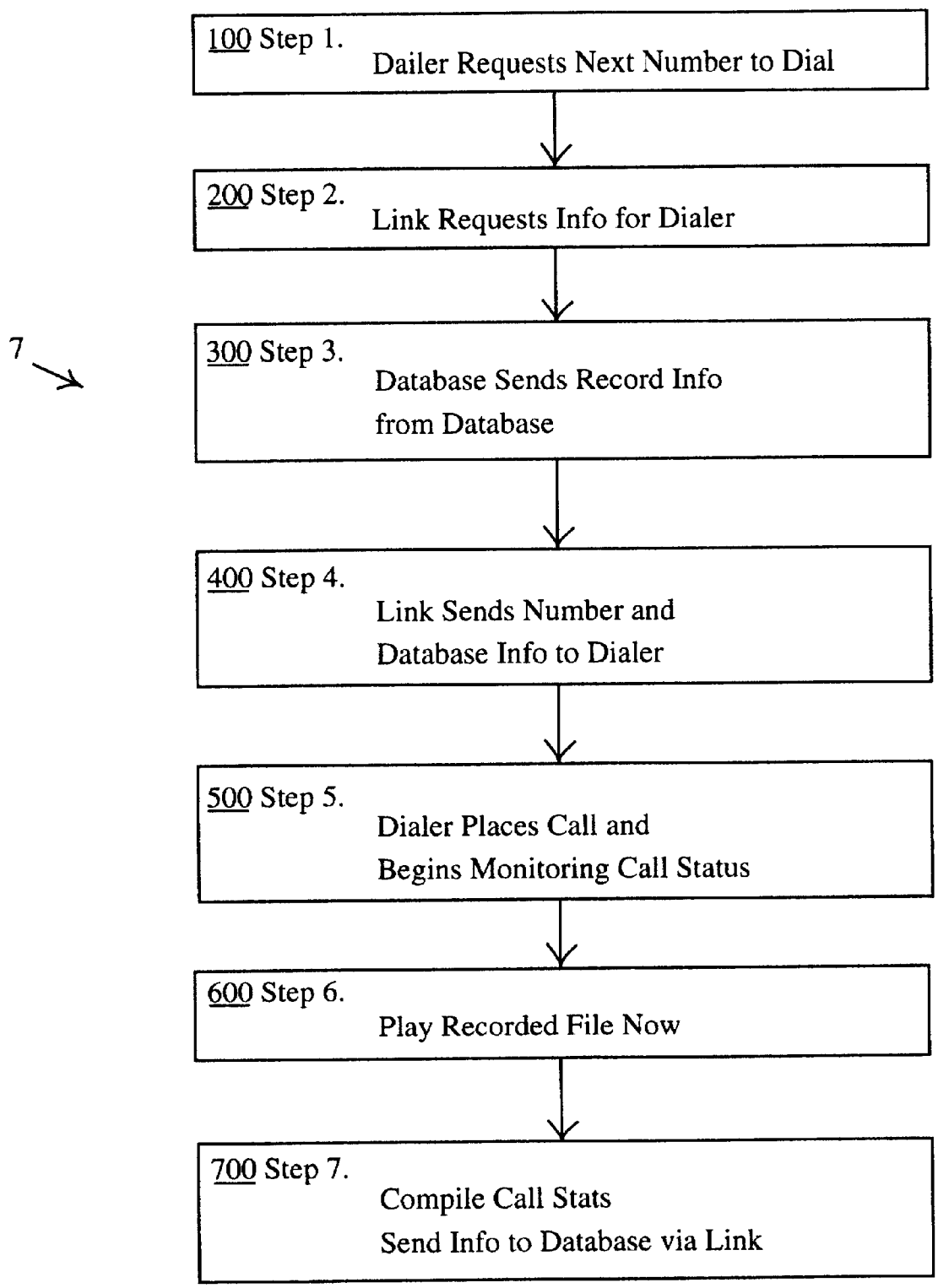
FIG. 2 is a chart of the seven(7) steps used in the novel telephone dialing software message delivery system invention of FIG. 1.

FIG. 2 is a chart 7 of the seven(7) steps used in the novel telephone dialing software message delivery system invention of FIG. 1. The seven(7) steps cover the interaction between a novel dialer program and a link program which is shown in greater detail in reference to FIGS. 3A–3C. The first four steps can be accomplished by the Dialogic systems covered under U.S. Pat. No. 5,371,787(machine answer detection); U.S. Pat. Nos.5,638,436 & 5,450,484(voice detection); U.S. Pat. No. 4,979,214(speech recognition); U.S. Pat. No. 5,404,400(outcalling apparatus) and U.S. Pat. No. 5,764,759, all of which are incorporated by reference. Other dialing systems can be used which initially determine when an answering machine has been detected through step 400.

An overview of the seven(7) steps will now be described. Referring to FIGS. 1 and 2, the first Step 100, the Dialer program requests the next (telephone) number to be dialed in the main computer 10. The "dialer" step 100 is responsible for dialing a telephone number, determining the status of the call and delivering the recorded message at an appropriate time. For example, each phone line is monitored by the Dialer program step. For example, if calls are being placed to 100 telephone lines simultaneously, there are 100 separate instances of the Dialer program being run. Alternatively, a single thread application where one version of the application controls the line.

Second Step 200 links the request info for the dialer step from a database of phone numbers. A novel link program insures that individual phone numbers are dialed only once. The link program is the only program which communicates with the database of phone numbers. Each dialer submits requests for new phone numbers to the Link which processes these requests in the order received and retrieves information from the database of phone numbers on behalf of each dialer program. In addition, the link program updates the database with completed call statistics which are communicated to the Link program from each Dialer as calls are completed. The purpose of the link program is to avoid system resource problems which can occur when hundreds of Dialers attempt to simultaneously communicate with a database directly. Third Step 300 has the database to the link send record info from the database. And the Fourth Step 400 sends the database Info to the dialer.

The subject invention novelty comes into play starting with the Fifth Step 500 in FIG. 2. Fifth Step 500 has the dialer place the call and begins monitoring call status. The call status can include whether the call connected to an answering machine, busy signal, reached a Facsimile tone, no answer, and the like. Sixth Step 600 plays the recorded file, and the seventh Step 700 compiles call stats(statistics) and sends the information to the database in main computer 10 via the link 50. After a call is completed, the novel program software updates each record with the result statistics(stats) of the call. The stats can include the disposition of the call(delivered to a live person or delivered to an answering machine), the length of connect, the call status, the time of day, and the like.

Figure 3A:
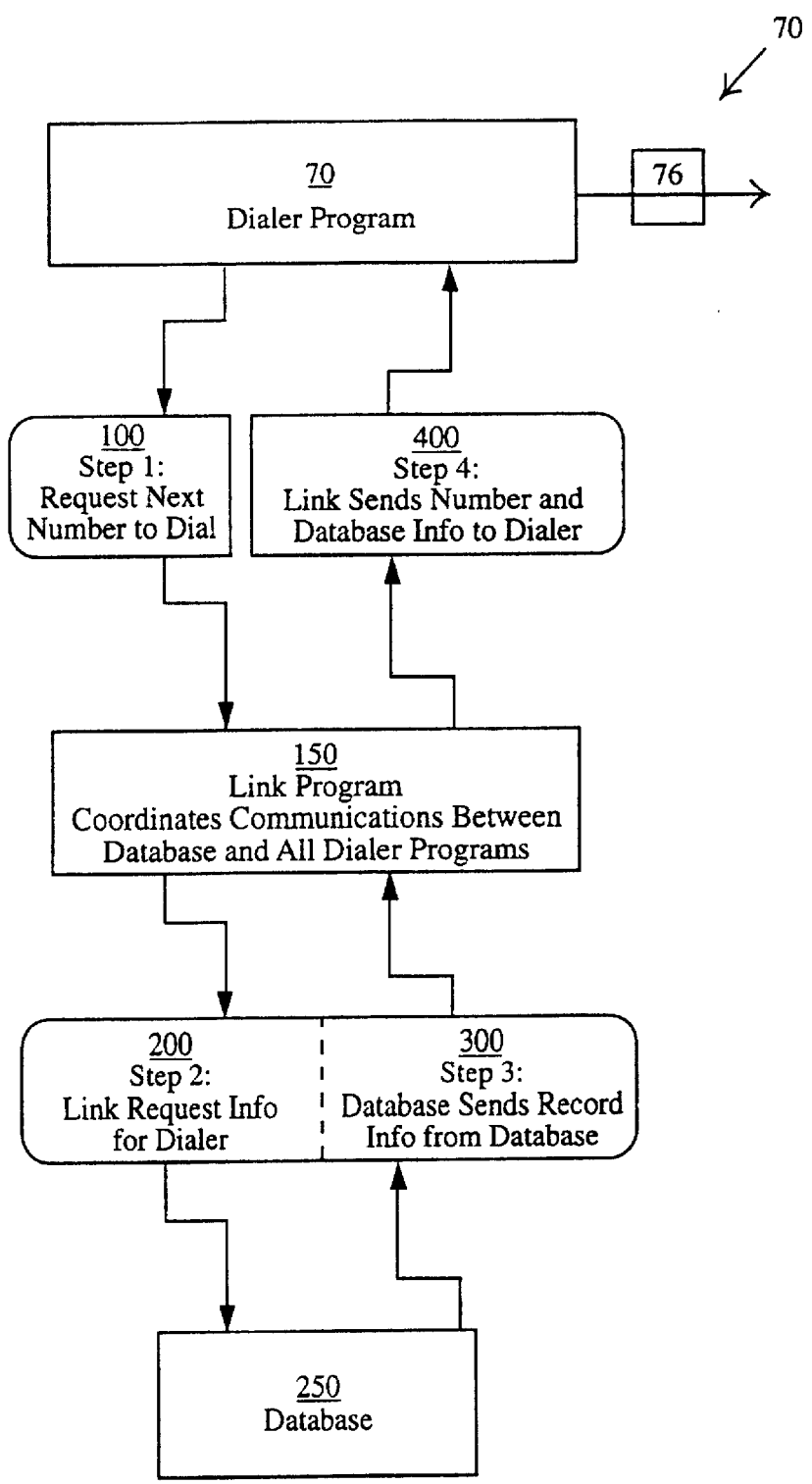
FIG. 3A is a flowchart of the dialer program portion steps 1–4 of the novel telephone dialing software message delivery system invention of FIG. 2.
Figure 3B:
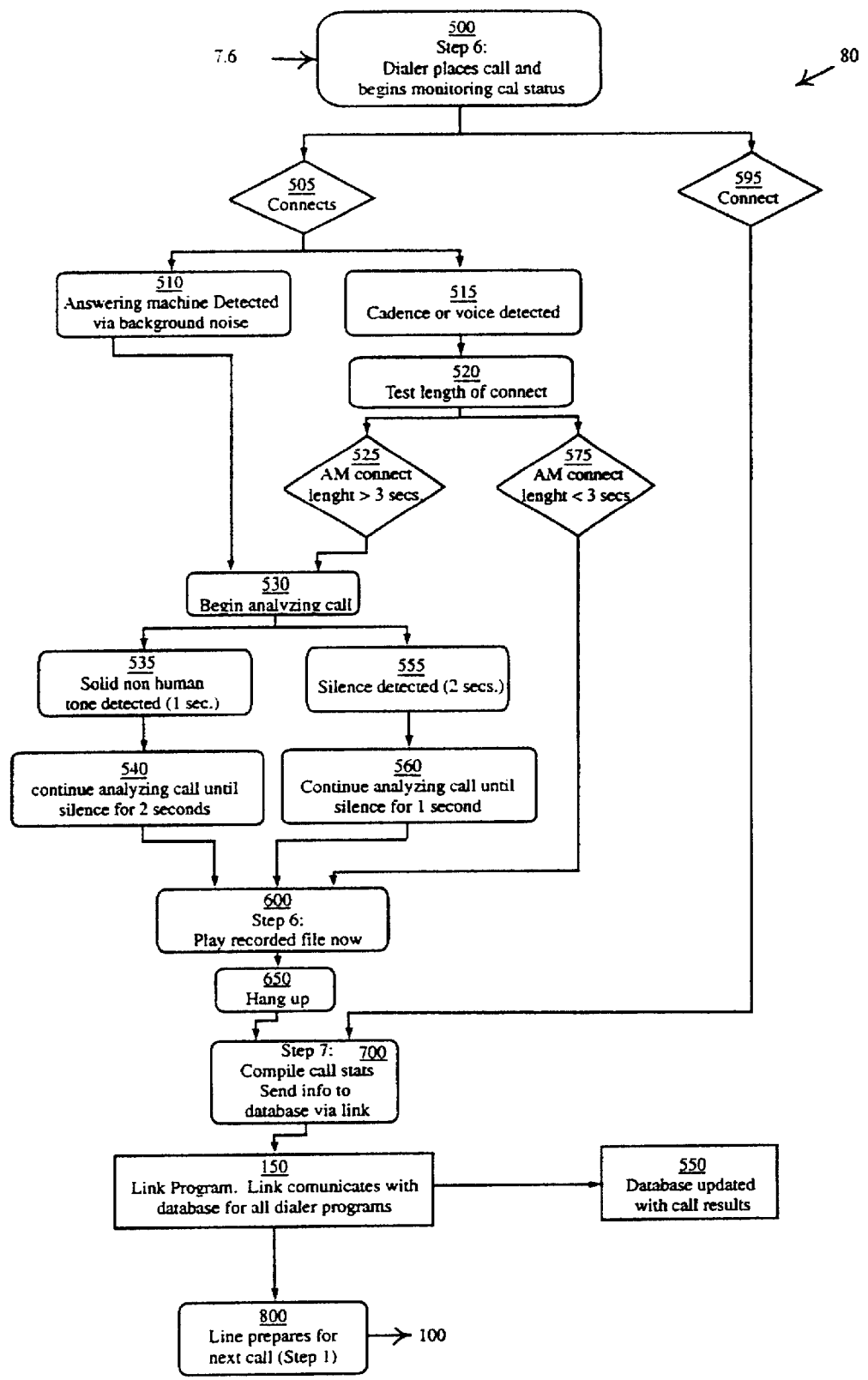
FIG. 3B is a flowchart of the dialer placing call and monitoring portion steps 5–7 of the novel telephone dialing software message delivery system invention of FIG. 2.
Figure 3C:
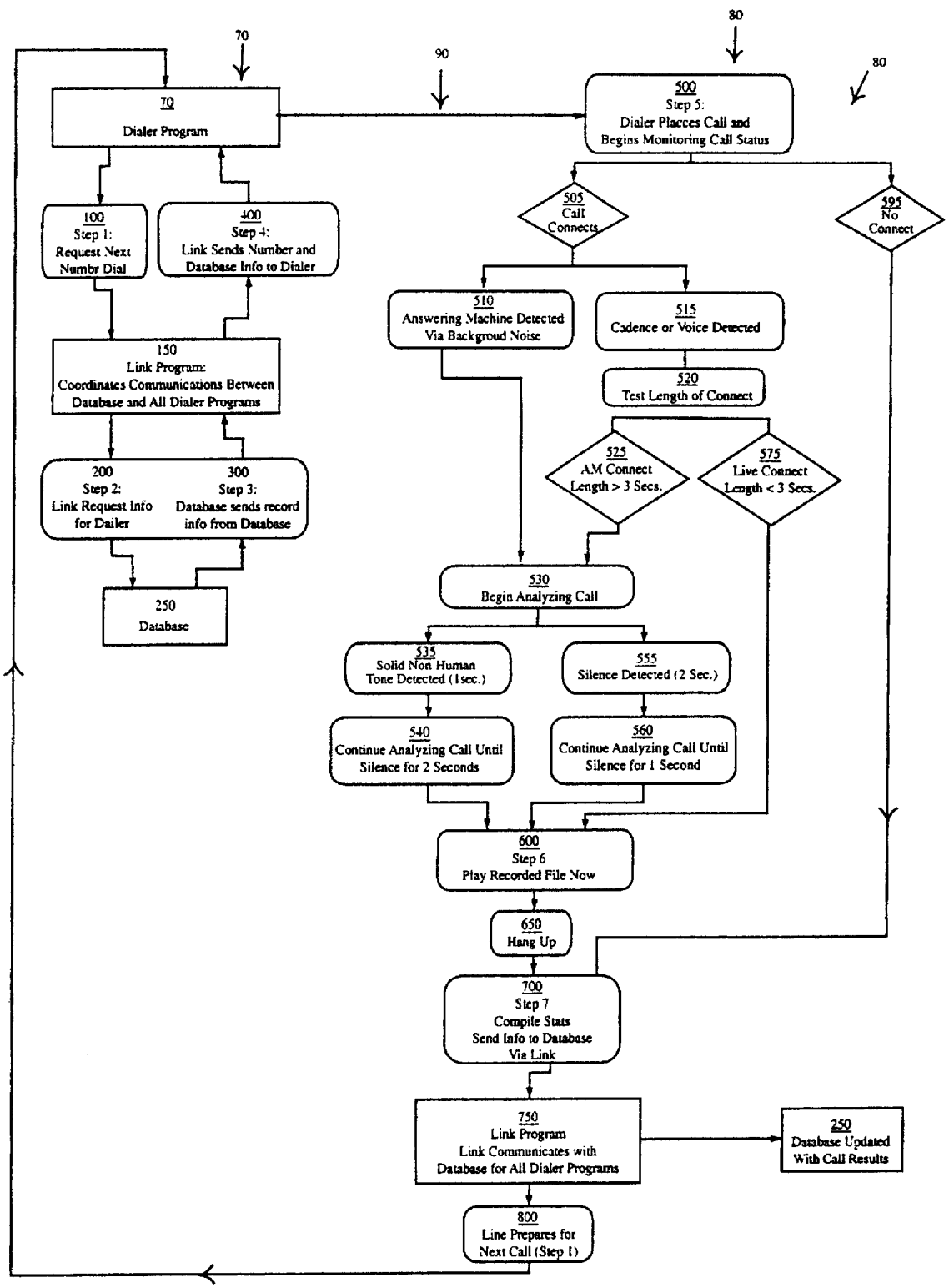
FIG. 3C is an overview of the entire flowchart process of the novel telephone dialing software message delivery system invention of FIGS. 2 and 3A–3B.

FIG. 3A is a flowchart 70 of the dialer program portion steps 1–4 of the novel telephone dialing software message delivery system invention of FIG. 2. FIG. 3B is a flowchart 80 of the dialer placing call and monitoring portion Steps 5–7 of the novel telephone dialing software message delivery system invention of FIG. 2, and will be explained in greater detail later. FIG. 3C is an overview of the entire flowchart process 90 of the novel telephone dialing software message delivery system invention of FIGS. 2 and 3A–3B. Referring to FIGS. 3A and 3C, the dialer program 70 initiates the first Step 100 which requests the next telephone number to dial and uses the link program 150 to communicate to the second Step 200 which is the link request for information for the dialer from the database 250. Third Step 300 has the Database 250 send record information to the link program 150 to the fourth Step 400 which is a process that sends the telephone and Database information from the link program to the dialer program 70 and to the flowchart shown in FIG. 3B. When the Dialer program 70 requests a new number to call, the Link program 150 sends the dialer program 70 the following bits of data: a telephone number, the name of the recorded messages(s) to play once connected, and the unique number of the record. When the dialer program 70 has completed a call it sends to the link program 150 the following: record number of completed call, call length and the results of the call. The first five Steps 100, 200, 300, 400 and 500 of FIGS. 3A–3C take place in the main computer system 10 of FIG. 1.

FIG. 3B is a flowchart 80 of the dialer placing call and the novel monitoring portion Steps 5–7 of the telephone dialing software message delivery system invention of FIG. 2. FIG. 3C is an overview of the entire flowchart process 90 of the novel telephone dialing software message delivery system invention of FIGS. 2 and 3A–3B. Referring to FIGS. 3B–3C, the fifth Step 500 receives by line 76 the telephone number and database information from the dialer program 70 and a dialer places the call and begins monitoring the call status. Two outputs can be the result of the fifth Step 500, either the call connects 505, or the dialed call doesn't connect 595. Any call which does not result in the telephone being answered by either a live person or a telephone answering machine is considered a "Non Connect". Examples of non connected calls are those resulting in Busy, No answer, No Ring, Facsimile tones, and Operator Interupts. If no connect, then the seventh Step 700 occurs where the system compiles the Call Stats and sends information to database 250 via link 150 and the line 800 prepares for the next call back to first Step 100.

Referring back FIGS. 3B and 3C, if a call connects 500 either path 510 or 515 occurs which will now be explained in detail. Under 510 an answering machine can be detected via background noise. See U.S. Pat. No. 5,371,787 to Hamilton, which is incorporated by reference. The CT hardware (20 of FIG. 1) can detect an answering machine by analyzing the frequency of the background noise present in the called party's voice response and compares it to a profile of the background noise typical of recorded messages. If the hardware 20 determines the presence of an answering machine in this manner it communicates this information to the novel system(via the Custom control software) and the novel part of the Dialer program 70 responds. If the hardware 20 does not detect an answering machine via its' built in detection, then the software in the Dialer program 70 determines whether the call is connected to a live person or an answering machine by analyzing the length(time) of the cadence of the voice which answered the telephone. The typical voice cadence 515 of a live person is much shorter than that of an answering machine. For example a live person answers the telephone generally in one of the following ways: "Hello?"(followed by silence), "Hello, Smith Residence"(followed by silence), "ABC Enterprises . . . how can I direct your call?"(followed by silence). In all of these cases, the spoken words occur for a very brief period of time(less than three seconds), 575 followed by a period of silence. In the case of a typical answering machine, the length of continuous human sound prior to a period of silence is much greater. An example of a typical answering machine message is "Thank you for calling the Smith Residence, we're not home right now, but if you leave a message after the tone we will call you back as soon as we can. Thank you for calling, and have a great day"(followed by silence). After analyzing the cadence the RealCall invention will have determined whether the call has reached an answering machine or reached a live person. The novel software system will then proceed to take the appropriate action.

From the answering machine substep 510 shown in FIGS. 3B and 3C, the next substep is to begin analyzing the call 530. From analyzing call substep 530, either a solid non human tone is detected for a minimum duration 1 second substep 535 or silence, is detected for a minimum duration of 2 seconds in substep 535.

Substeps 535 and 555 encompass the heart of the subject invention. In order to have reached step 530, the system must have determined it has reached an answering machine. The RealCall invention now must try to determine the appropriate time to launch the prerecorded message. To 'analyze' the call, the invention begins to RECORD the answering machine. The novel program only has instructions to stop recording under two conditions: (1) if it "hears" the presence of a solid, non human tone lasting at least one second in length(substep 535), or (2) it hears no sound for at least two continuous seconds(substep 555). A solid non human tone (substep 535) would be typical of a "BEEP" indicating that machines readiness to begin recording. However, since many answering machines play single or a series of "BEEP" tones lasting less than one second, the two seconds of silence(substep 540) will act as a safety measure to insure that we begin playback if the novel software does not recognize the "BEEP" indicator(substeps 540 and 560).

During testing of the RealCall invention, simply identifying a "BEEP"(535) or two seconds of silence(555) did not indicate the moment when the answering machine begins recording with any high degree of accuracy. The reasons for the inaccuracy stems from many factors including: (1)

machines which play multiple "BEEPS" before recording starts, (2) machines which play on-hold music(solid, non human tones) while preparing to record, (3) Outgoing messages(OGMs) which contain periods of silence after the end of the messages but prior to the announcing of a "beep" tone indicating the start of recording(this usually is the result of the owner of the answering machine who records their OGM and then cannot stop the recording immediately after recording their script).

In order to obtain a higher degree of accuracy as to the moment recording begins, the RealCall invention uses dual alternative two step tiers. If the system had previously identified an initial "BEEP"(solid non-human noise(step 535)), the invention then begins re-recording the call, this time with instructions to end recording only after a period of two continual seconds of silence(substep 540). This logic believes that a "BEEP" or the playing of music has already occurred, and now the system is searching for the indication of recording, which will be evidence by silence. Consequently, if the first tier analysis terminated for the presence of two seconds of silence(substep 555), the second tier analysis will simply test for another period of at least one second of additional silence(substep 560) before launching. In this situation, the second tier search for additional silence eliminates false recording detection in situations where an OGM plays a period of silence prior to playing a "BEEP". Testing of the RealCall invention has determined that adding the second tier of analysis has increased overall accuracy by over 75% of placing calls over current systems described in the prior art section of this invention.

As mentioned above, from substep 535(in FIGS. 3B and 3C), the system continues analyzing call until silence for 2 seconds (substep 540). After which from substep 540, the sixth Step 600 occurs where the system plays the recorded information file message, followed by the system disconnects the call substep 650 and the seventh Step 700 where the system compiles Call Stats and sends information to database 250 via link program 150 and substep 800 which prepares the system for the next telephone number and the first Step 100.

As previously mentioned, the other path from Begin Analyzing Call substep 530, is if silence is detected(2 sec) 555. From substep 555, the next substep is to Continue Analyzing Call Until Silence for 1 seconds, substep 560. From substep 560, the sixth Step 600 has the system play the recorded information file, followed by the system disconnect substep 650 and the seventh Step 700 where the system compiles Call Stats(previously described) and sends the Stats information to database 250 via link program 150 and substep 800 which prepares the system for the next telephone number and the first Step 100.

Referring to FIGS. 3B–3C, the Call Connects 505 passes through substep 515 when cadence or voice is detected. Next the system tests the length of the connect, substep 520. If an AM(answering machine) Connect is indicated by a candence length greater than 3 seconds, substep 525, then the system begins analyzing the call to determine the appropriate time to play the message substep 530, and the substeps 535 and 555 are checked as previously described. AM connect refers to Answering Machine Connect, or a call which has connected to an answering machine, as opposed to calls which are connected to live persons or facsimile machines.

Referring to FIGS. 3B–3C, if the test length of connect identifies a Live Connect as indicated by a cadence length of less than 3 seconds substep 575, then the system goes to the sixth Step 600 where the system plays the recorded information message immediately and so forth as previously described.

FIG. 4 shows an exemplary output Recap form of the RealCall invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An automated method of delivering a recorded information message in a nontruncated form via a telephone dialing system, comprising the steps of:

(a) placing a call to a telephone number selected from a database of telephone numbers;

(b) monitoring status of the call to determine if the call is connected or not connected, if the call is connected go to step(d), if the call is not connected go to step (c);

(c) disconnecting the call and updating the database to reflect the not connected result as a call status and going to step (a) for another telephone number selected from the database;

(d) detecting at the telephone number either one of an answering machine noise signal and a voice signal, and for the detected answering machine signal go to step (f), and for the detected voice signal go to step (e);

(e) playing the recorded information message if the detected voice signal runs less than a first pre-selected time period and then updating the database accordingly to reflect the call status and repeating steps (a)–(e) for another telephone number selected from the database, and if the detected voice signal runs greater than the first pre-selected time period go to step (f);

(f) detecting either one of a continuous tone and a period of silence;

(g) playing the recorded information message after a second pre-selected time period after the continuous tone, and updating the database accordingly to reflect the call status, and repeating steps (a) through (g) for an additional telephone number selected from the database; and (h) playing the recorded information message after a third pre-selected time period after the period of silence, and updating the database accordingly to reflect the call status, and repeating steps (a) through (h) for an additional telephone number selected from the database; and (i) repeating steps (a) through (h) until at least a pass through of all the telephone numbers from the database have been called and the call status of each of the telephone numbers has been completed, wherein beginning words of the recorded information message are not cut off and recorded information messages are automatically delivered in a nontruncated form.

2. The automated method of claim 1, wherein the first pre-selected time period and the second pre-selected time period and the third pre-selected time period are different from one another.

3. The automated method of claim 2, wherein the continuous tone lasts at least approximately 1 second, and the second period pre-selected time period includes approximately 2 seconds of silence.

4. The automated method of claim 2, where the period of silence lasts approximately 2 seconds and the third pre-selected time period includes approximately 1 second of silence.

5. The automated method of claim 2, wherein the first pre-selected time period runs up to approximately 3 seconds.

6. An automated calling system for delivering nontruncated pre-recorded information messages, comprising in combination:

means for placing a call to a selected telephone number and receiving a response;

means for determining if the response is from an answering machine signal or a voice signal;

means for playing a pre-recorded voice message if the voice signal lasts less than a first pre-selected time period;

means for analyzing the answering machine signal and the voice signal lasting greater than the first pre-selected time period, to form an analyzed signal;

means for detecting a continuous tone from the analyzed signal followed by a second pre-selected time period, and then playing the pre-recorded voice message; and means for detecting a period of silence from the analyzed signal followed by a third pre-selected time period, and then playing the pre-recorded voice message, wherein beginning words of the pre-recorded voice message are continuously not cut off and the pre-recorded information messages are automatically delivered in a nontruncated form.

7. The automated calling system of claim 6, further comprising:

a database of selected telephone numbers having the selected telephone number.

8. The automated calling system of claim 6, wherein the first pre-selected time period and the second pre-selected time period and the third pre-selected time period are different from one another.

9. The automated calling system of claim 6, wherein the continuous tone lasts at least approximately 1 second, the second period pre-selected time period includes approximately 2 seconds of silence.

10. The automated calling system of claim 6, where the period of silence lasts approximately 2 seconds and the third pre-selected time period includes approximately 1 second of silence.

11. The automated calling system of claim 6, wherein the first pre-selected time period runs up to approximately 3 seconds.

12. An automated method of delivering a recorded information message in a nontruncated form via a telephone dialing system, comprising the steps of:

(a) placing a call to a telephone number selected from a database of telephone numbers;

(b) detecting either an answering machine signal or a voice signal from the called telephone number;

(c) playing a recorded information message if the detected voice signal runs less than a first pre-selected time period and repeating the above steps for another telephone number selected from the database;

(d) analyzing the answering machine signal and the voice signal that runs greater than the first pre-selected time period to form an analyzed signal;

(e) detecting from the analyzed signal either a continuous tone or a period of silence;

(f) playing the recorded information message after a second pre-selected time period following the continuous tone, and repeating the above steps for an additional telephone number selected from the database; and (g) playing the recorded information message after a third pre-selected time period following the period of silence, and repeating the above steps for still an additional telephone number selected from the database; and (h) repeating the above steps until at least a pass through of all the telephone numbers from the database have been called, wherein the first pre-selected time period is different from the second pre-selected time period which is different from the third preselected time period, and beginning words of the recorded information message are not cut off and the message is continuously delivered in a nontruncated form.

13. The automated method of claim 12, wherein the continuous tone lasts at least approximately 1 second, an the second period pre-selected time period includes approximately 2 seconds of silence.

14. The automated method of claim 12, wherein the first pre-selected time period runs up to approximately 3 seconds.

15. The automated method of claim 12, where the period of silence lasts approximately 2 seconds and the third pre-selected time period includes approximately 1 second of silence.

* * * * *